United States Patent
Madurawe

(10) Patent No.: US 9,591,245 B2
(45) Date of Patent: Mar. 7, 2017

(54) IMAGE SENSOR PIXELS WITH ADJUSTABLE BODY BIAS

(71) Applicant: SEMICONDUCTOR COMPONENTS INDUSTRIES, LLC, Phoenix, AZ (US)

(72) Inventor: Raminda Madurawe, Sunnyvale, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 98 days.

(21) Appl. No.: 14/686,570

(22) Filed: Apr. 14, 2015

(65) Prior Publication Data

US 2016/0307949 A1    Oct. 20, 2016

(51) Int. Cl.
H04N 5/369        (2011.01)
H04N 5/353        (2011.01)
H04N 5/3745       (2011.01)

(52) U.S. Cl.
CPC ........... *H04N 5/3698* (2013.01); *H04N 5/353* (2013.01); *H04N 5/37452* (2013.01)

(58) Field of Classification Search
CPC .. H01L 27/14616; H04N 5/372; H04N 5/357; H04N 5/378; H04N 5/3698
See application file for complete search history.

(56) References Cited

U.S. PATENT DOCUMENTS

| | | | |
|---|---|---|---|
| 4,626,676 A | 12/1986 | Gerardin | |
| 6,111,245 A | 8/2000 | Wu | |
| 7,291,876 B1 | 11/2007 | Tian | |
| 7,330,049 B2 | 2/2008 | Perisetty | |
| 8,497,546 B2 | 7/2013 | Hynecek | |
| 8,791,419 B2 | 7/2014 | Chang | |
| 2001/0032921 A1 | 10/2001 | Forsberg | |
| 2003/0122533 A1 | 7/2003 | Prescott | |
| 2005/0007473 A1* | 1/2005 | Theil | H01L 27/14643 348/308 |
| 2010/0327390 A1 | 12/2010 | McCarten | |
| 2015/0035028 A1* | 2/2015 | Fan | H01L 27/14623 257/292 |
| 2016/0037111 A1* | 2/2016 | Dai | H04N 5/378 250/208.1 |
| 2016/0100114 A1* | 4/2016 | Bergey | H04N 5/3575 348/250 |

* cited by examiner

*Primary Examiner* — Twyler Haskins
*Assistant Examiner* — Angel L Garces-Rivera
(74) *Attorney, Agent, or Firm* — Treyz Law Group, P.C.; Andrew C. Milhollin

(57) ABSTRACT

An image sensor with an array of image sensor pixels is provided. The array may be configured to operate in a rolling shutter operation mode or a global shutter operation mode. Each pixel may include body bias control circuitry that generates a body bias control signal. Each pixel may include a photodiode having a p-type terminal that receives the body bias control signal. The body bias control signal may be adjusted to a negative voltage level during the pixel operation to improve the pixel full-well capacity. The body bias control signal may be adjusted to a negative voltage level during reset and charge transfer operations and may be adjusted to a ground voltage level during readout and charge accumulation operations. During rolling shutter operation mode, different body bias control circuits may be used to bias respective rows of pixels within the array.

22 Claims, 8 Drawing Sheets

IMAGE SENSOR PIXELS WITH ADJUSTABLE BODY BIAS

BACKGROUND

This relates generally to image sensors, and more specifically, to image sensors containing pixels with adjustable body bias voltage.

Image sensors are commonly used in electronic devices such as cellular telephones, cameras, and computers to capture images. Conventional image sensors are fabricated on a semiconductor substrate using complementary metal-oxide-semiconductor (CMOS) technology or charge-coupled device (CCD) technology. The image sensors may include an array of image sensor pixels each of which includes a photodiode and other operational circuitry such as transistors formed in the substrate.

Capturing images using a CMOS image sensor often involves using an electronic rolling shutter (ERS) algorithm to successively reset, integrate, and read out single rows of image pixels on the image sensor. In the traditional ERS algorithm, row reset and readout are typically performed for a single row at a given time. Row reset refers to an operation which prepares a pixel for light capture by resetting a charge storage node to a given voltage. Row readout refers to an operation on image pixels that have been exposed to light for a desired duration of time, which involves sampling the pixel columns of a given row and converting a value related to the amount of charge stored by the pixel during exposure to a digital signal.

Image sensors typically include a photodiode having a pinning-voltage which is a design parameter set by the doping levels of the photodiode. During normal operation, a photodiode node is first reset to the pinning-voltage using transistor circuitry. Then photons are allowed to enter the photodiode region for a pre-defined amount of time. The photons are converted to electrons inside the photodiode area, and these electrons reduce the reset pinning-voltage. In this process, the total charge stored, Q, is commonly referred to as the saturation full well (SFW) and depends on the well capacity of the photodiode. When it is time to read out the stored signal, the stored charge Q at the photodiode node is transferred to a floating diffusion node through additional transistor circuitry. Pixel design should maximize the amount of charge Q that can be transferred from the photodiode to the floating diffusion node. If not, the charge spill back manifests as a loss to image quality. Alternatively, image sensors are often operated in global shutter (GS) mode. In this mode, an additional diode and an additional transfer gate are typically formed at the front surface of the substrate adjacent to the photodiode. In GS, all photo-diode accumulated charge is transferred to duplicate diodes in one global pulse, and the duplicate diodes are read row by row in ERS mode.

There are many sources of noise that may degrade the captured signal Q. Dark-current refers to electrons generated and captured by a photodiode from non-photon sources. Dark-current can originate from many sources including: Si defects due to implant & plasma damage, metallic contaminants in photodiode volume, avalanche and/or Zener high field electro-hole pair generation, SRH electron-hole pair generation, trap related band-to-band-tunneling (BTBT), transfer gate induced BTBT on both photodiode and floating diffusion sides, and many others. In order to achieve high image quality, dark-current must be reduced. In GS pixels, the duplicated diodes must preserve the charge transferred during the entire read-out time. Any disturbance in charge is extra noise in the form of Global-Shutter-Efficiency (GSE). It is desirable to get very high GSE.

It would therefore be desirable to be able to achieve high photodiode well capacity and minimal noise without sacrificing image quality.

CMOS image sensors are used heavily in the mobile industry in cell phone and PDA applications. These products require low power consumption to increase battery life. Pixel operating voltage does not scale to lower voltages easily due to pinning and charge transfer limitations. It is further desirable to reduce maximum pixel operating voltage to reduce power, while not degrading image quality.

DETAILED DESCRIPTION

Embodiments of the present invention relate to image sensors and, more particularly, to image sensors containing pixels with adjustable body bias voltage. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices include image sensors that gather incoming light to capture an image. The image sensors may include arrays of imaging pixels. The pixels in the image sensors may include photosensitive elements such as photodiodes that convert the incoming light into image signals. Image sensors may have any number of pixels (e.g., hundreds or thousands of pixels or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Figure 1:
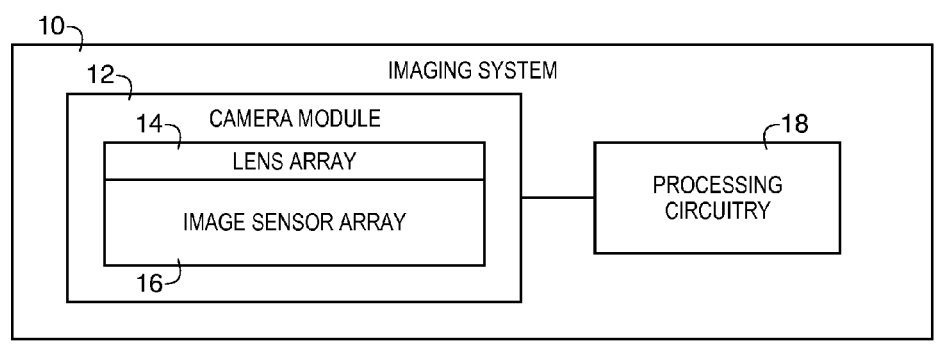
FIG. 1 is a diagram of an illustrative electronic device in accordance with an embodiment.

FIG. 1 is a diagram of an illustrative electronic device in accordance with an embodiment. Imaging system 10 of FIG. 1 may be a portable imaging system such as a camera, a cellular telephone, a video camera, or other imaging device that captures digital image data. Camera module 12 may be used to convert incoming light into digital image data. Camera module 12 may include an array of lenses 14 and a corresponding image sensor array 16. Lens array 14 and image sensor array 16 may be mounted in a common package and may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensor array 16 or an integrated circuit within module 12 that is associated with image sensor array 16). Image data that has been captured and processed by camera module 12 may, if desired, be further processed and stored using processing circuitry 18. Processed image data may, if desired, be provided to external equipment (e.g., a computer or other device) using wired and/or wireless communications paths coupled to processing circuitry 18.

Image sensor array 16 may contain an array of individual image sensors configured to receive light of a given color by providing each image sensor with a color filter. The color filters that are used for image sensor pixel arrays in the image sensors may, for example, be red filters, blue filters, and green filters. Each filter may form a color filter layer that covers the image sensor pixel array of a respective image sensor in the array. Other filters such as white color filters, dual-band IR cutoff filters (e.g., filters that allow visible light and a range of infrared light emitted by LED lights), etc. may also be used.

Figure 2A:
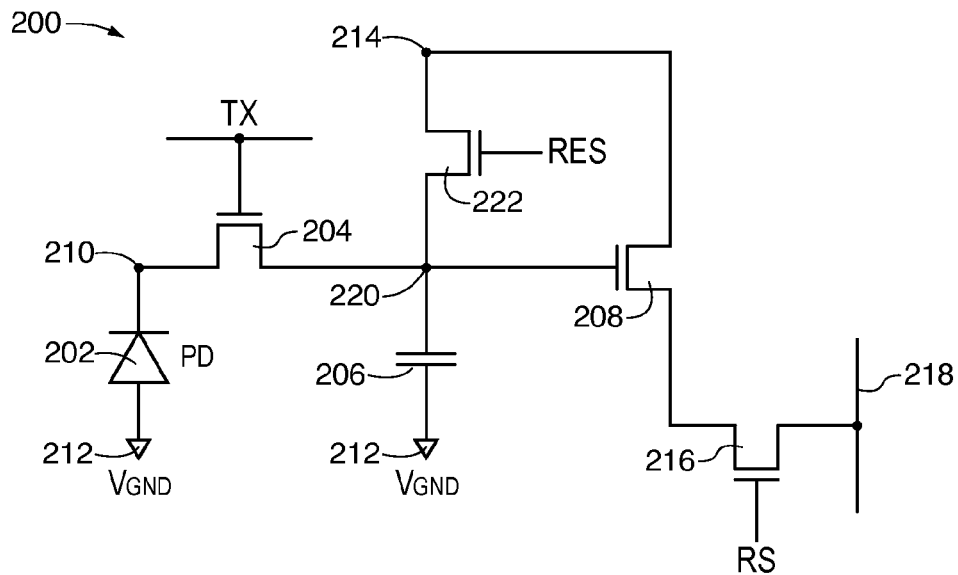
FIG. 2A is a diagram of a conventional image pixel circuit with a photodiode and a single floating diffusion node.

FIG. 2A is a diagram of a conventional image pixel circuit with a photodiode and a single floating diffusion node. As shown in FIG. 2A, pixel 200 includes a photodiode (PD) 202, a transfer transistor 204, a source follower (SF) transistor 208, a row select transistor 216, a reset transistor 222, a power supply voltage 214, a photodiode voltage node 210, a ground voltage ($V_{GND}$) 212, a floating diffusion (FD) node 220, a capacitive storage element 206, and a column line 218.

It is generally known that column line 218 is coupled to a plurality of signal evaluation transistors that forms column readout circuitry to evaluate the signal output.

The photodiode 202 accumulates a photo-generated charge in a doped region of the substrate. The negative terminal of photodiode 202 is coupled to ground voltage $V_{GND}$. The charge accumulated in photodiode 202 is selectively passed from photodiode voltage node 210 to floating diffusion node 220 through transfer transistor 204 when activated by transfer control signal TX. The charge is held at floating diffusion node 220 using capacitive element 206. The negative terminal of capacitive element 206 is coupled to ground voltage $V_{GND}$. The gate terminal of source follower transistor 208 is coupled to the floating diffusion node 220. The charge at floating diffusion node 220 thereby controls the magnitude of the power supply voltage 214 allowed to pass through source follower transistor 208. When a particular row containing pixel 200 is selected by an activated row select transistor 216, the signal that passes through the source follower transistor 208 is passed on the column line 218 to column readout circuitry.

The gate terminal of transfer transistor 204 is coupled to a transfer control signal line for receiving the transfer control signal TX, and thereby controls the coupling of photodiode 202 to floating diffusion node 220. The node that receives power supply voltage 214 is coupled to floating diffusion node 220 through reset transistor 222. The gate terminal of reset transistor 222 is coupled to a reset control line for receiving a reset control signal RES in order to control a reset operation in which the power supply voltage 214 is fed to floating diffusion node 220.

A row select signal RS is asserted to activate the row select transistor 216. Although not shown, the row select signal RS is provided to all of the pixels of the same row of the array through a common line. The RES and TX signals are provided to all of the pixels in the same row of the array in a similar fashion. Power supply voltage 214 is coupled to column line 218 through transistors 208 and 216. Column line 218 is coupled to all of the pixels of the same column of the array and typically has a current sink at its lower end. Signals from pixel 200 are selectively fed into a column readout circuit through column line 218.

A value can be read from pixel 200 in an ERS two-step correlated double sampling (CDS) process. First, the floating diffusion node 220 and the photodiode voltage node 210 are set to a reset voltage by activating reset transistor 222 and transfer transistor 204. The reset voltage is read out through column readout circuitry to provide an accurate reset voltage. During a charge integration period preceding reset, photodiode 202 accumulates a charge from incident light. After sampling the reset voltage, transfer transistor 204 is activated and the charge from the photodiode 162 is passed through the transfer transistor 204 to the floating diffusion node 220. The transferred photodiode charge alters the reset voltage level of floating diffusion node 220. The altered voltage controls the gate of source follower transistor 208 and a corresponding signal is passed to column line 218 through row select transistor 216. This is the second signal sampled by the column readout circuitry. The difference between the two readout signals allows for CDS to accurately measure the accumulated photodiode charge.

Figure 2B:
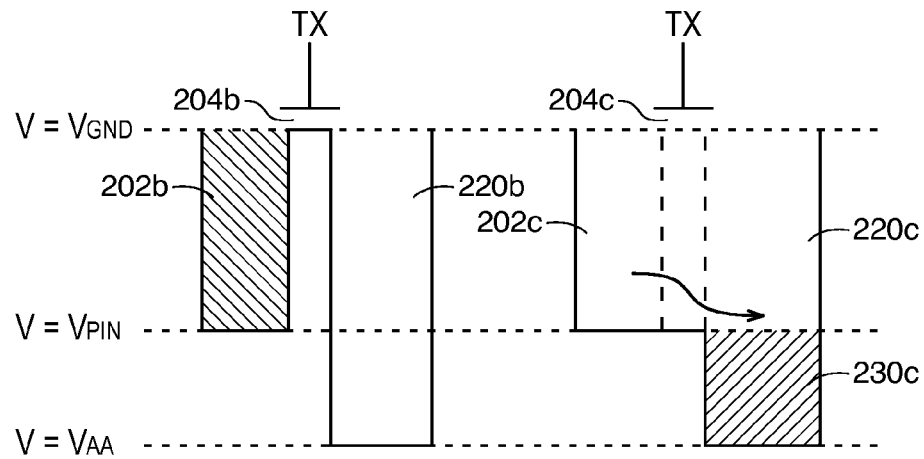
FIG. 2B is a diagram showing potential wells of conventional image pixel circuit shown in FIG. 2A for charge transfer gate at off and on conditions.

Two conditions of PD charge in pixel 200 are shown in FIG. 2B, where the vertical dimension shows voltage levels within the pixel (potential well), and the horizontal dimension shows pixel cross section location through PD 202, transfer transistor 204 and FD 220 of FIG. 2A. Regions 202b and 220b show conditions in which TX is in off state 204b, while regions 202c and 220c show the conditions in which TX is on state 204c. PD 202 is coupled or decoupled to FD 220 by modulating TX between these two on and off states respectively. When TX is off, during integration, PD 202b could completely saturated. The saturation PD charge (aka full-well) in 202b is determined by voltage levels $V_{GND}$ & $V_{PIN}$. In addition to the voltage levels, photodiode doping levels also contribute to full-well capacity. FD 220b is at $V_{AA}$ after reset. When TX is in the on state 204c, PD charge 202b is allowed to flow into FD node 220b. The maximum FD charge 230c transferred from PD is determined by $V_{PIN}$ and $V_{AA}$ voltage levels as shown. PD 202c is designed to completely empty and reach voltage $V_{PIN}$, while FD 220c is designed to fully collect all the charge 230c that could have been collected by saturated PD 202b. Charge conservation dictates maximum PD 202b charge must equal to maximum FD charge 230c. To completely transfer charge, the on state 204c of TX must lower the transfer transistor surface barrier to a voltage level less than or equal to $V_{PIN}$.

In pixel 200 of FIG. 2A, a ground voltage $V_{GND}$ is fed into the negative terminals of photodiode 202 and capacitive element 206. $V_{GND}$ is shared by other pixel transistors constructed in the common substrate, and by column readout circuitry. FIG. 2B shows how the three voltages $V_{GND}$, $V_{PIN}$ and $V_{AA}$ control the well capacity and charge transfer operations of pixel 200. In this arrangement, the charge storage capacity of photodiode 202 cannot be increased without increasing the pinning voltage, which translates to increasing the magnitude of power supply voltage 214. Increasing the maximum voltage requirements of an image sensor in this way is undesirable as it increases power consumed by the image-sensor and adds to the processing complexity and cost of an image sensor. Therefore it would be desirable to employ a method of improving the charge storage capacity of a photodiode without increasing the maximum voltage requirements of the system.

Figure 3A:
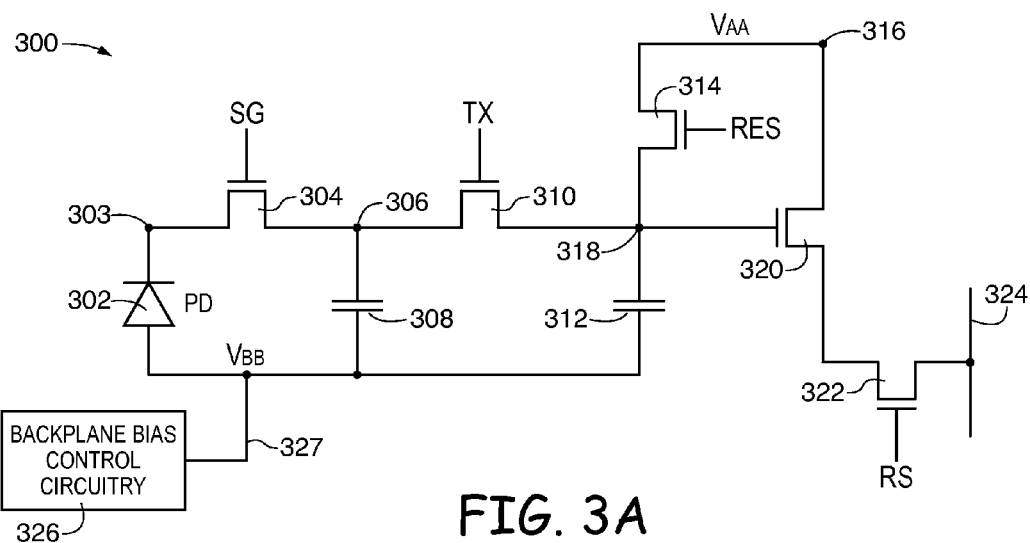
FIG. 3A is a diagram of an illustrative image pixel circuit with a photodiode, a storage node, a floating diffusion node, and backplane bias control circuitry connected to the photodiode and capacitive storage elements of the storage node and the floating diffusion node in accordance with an embodiment.

FIG. 3A is a diagram of an illustrative image pixel circuit with a photodiode, a storage node, a floating diffusion node, and backplane bias control circuitry connected to the photodiode and capacitive storage elements of the storage node and the floating diffusion node in accordance with an embodiment. FIG. 3A, as shown, is an embodiment for Global-Shutter operation. The backplane of the pixel circuit may or may not be common to other pixel transistors based on fabrication options. The backplane may not be common to other column readout circuitry used to evaluate pixel output voltages. As shown in FIG. 3A, image pixel 300 may include a photodiode 302, a photodiode voltage node 303, a storage gate transistor 304 controlled by a storage signal SG, a storage node 306 that may be coupled to a capacitive storage element 308, a transfer gate 310 controlled by a transfer signal TX, a floating diffusion node 318 that may be coupled to a capacitive storage element 312, a reset transistor 314 controlled by a reset signal RES, a source follower transistor 320, a row select transistor 322 that may be controlled by a row select signal RS, a power supply voltage $V_{AA}$ that may be applied at voltage node 316, a column line 324, and backplane bias control circuitry 326 that may generate a bias voltage $V_{BB}$ and that may be coupled to photodiode 302, capacitive storage element 308, and capacitive storage element 312 through line 327. In FIG. 3A, Global-Shutter elements storage gate 304, storage node 306, and capacitive element 308 are optional, and PD voltage node 303 may be directly connected to transfer transistor 310 to construct a Rolling-Shutter pixel. It should be understood that FIG. 3A shows the circuitry for operation for a single pixel 300 and that in practical use, there may be an M×N array of pixels arranged in M rows and N columns with the pixels of the array accessed using row and column select circuitry.

Backplane bias control circuitry 326 may generate either a constant or an adjustable bias control signal $V_{BB}$. Adjustable bias control signal $V_{BB}$ may then be fed to photodiode 302, capacitive storage element 308, and capacitive storage element 312 through line 327. Having an adjustable $V_{BB}$ signal offers two modes of operation. In a first mode, the $V_{BB}$ voltage may be held at a negative constant voltage during the entire pixel operation. An on chip negative voltage generator may bias the entire pixel array to a common voltage. In this mode, it should be noted that by holding $V_{BB}$ at a negative voltage, it becomes possible to increase the charge storage capacity of photodiode 302 without increasing power supply voltage $V_{AA}$. In a second mode, $V_{BB}$ may be adjusted to a negative voltage during charge transfer and reset operation and may then be changed to ground voltage level during charge-accumulation and readout in order to allow a lower voltage drop across oxides and junctions to improve reliability and further reduce reverse-bias junction leakage currents. In this mode, it should be noted that by holding $V_{BB}$ at a negative voltage during reset and charge transfer, it becomes possible to increase the charge storage capacity of photodiode 302 without increasing power supply voltage $V_{AA}$.

Photodiode 302 may convert incident photons to electrons which may be selectively passed to storage node 306 through storage gate transistor 304 when activated by storage control signal SG. The voltage of storage control signal SG may vary between a negative level that turns storage gate transistor 304 off and a positive level that turns storage gate transistor 304 on. The source follower transistor 320 may have its gate terminal connected to the floating diffusion node 318 and thus may control the signal appearing at node 318. The contents of storage node 306 may be selectively passed to floating diffusion node 318 through transfer transistor 310 when activated by transfer signal TX. The voltage level of transfer signal TX may include negative and positive voltage levels required to ensure proper on and off states of transfer transistor 310. When a particular row containing pixel 300 is selected by activated row select transistor 322, the signal amplified by the source follower transistor 320 may be passed on the column line 324 to column readout circuitry. The column readout circuitry resides in a location on the image sensor chip where the substrate is isolated from the pixel array substrate. Thus the two substrates can be biased to two different potentials. The photodiode 302 may accumulate a photo-generated charge in a doped region of the substrate. It should be understood that pixel 300 may include a photogate or other photon-to-charge converting device, in lieu of a photodiode, as the initial accumulator for the photo-generated charge. It should be further understood that PD 302 may be constructed in a first substrate region while transistors 314, 320 and 322 may be constructed in a second substrate region isolated from said first substrate region. In other embodiments, floating diffusion node 318 may have two diffusion substrate components: a first substrate component that is coupled to backplane of a first substrate region at $V_{BB}$ and a second substrate component that is coupled to a second substrate region at $V_{GND}$. In this manner, the second substrate region may be at a constant voltage level while the first substrate region may be modulated between different voltage levels.

A row select signal RS may be selectively asserted to activate the row select transistor 322. Although not shown, the row select signal RS may be provided to all of the pixels of the same row of the array through a common line. The RES, TX, and SG signals may be provided to all of the pixels in the same row of the array in a similar fashion. Power supply voltage $V_{AA}$ at node 316 may be coupled through reset transistor 314 to floating diffusion node 318 and may also be coupled to column line 324 through source follower transistor 320 and row select transistor 322. The gate terminal of reset transistor 314 may be coupled to a reset control line for receiving a reset control signal RES in order to control a reset operation in which power supply voltage $V_{AA}$ is connected to floating diffusion node 318. Column line 324 may be coupled to all of the pixels of the same column of the array and typically has a current sink at its lower end. Signals from pixel 300 may be selectively coupled to a column readout circuit through column line 324.

Figure 3B:
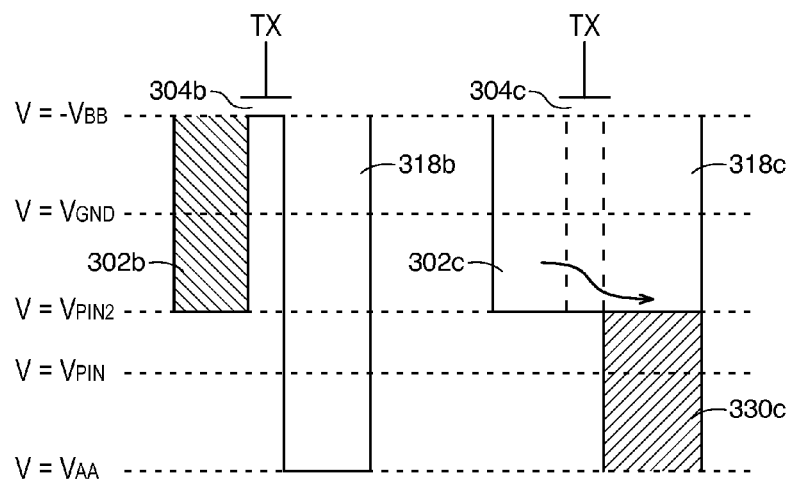
FIG. 3B is a diagram showing potential wells of the charge transfer gate in the illustrative image pixel circuit shown in FIG. 3A at off and on conditions.

The increased well capacity and the transferred charge of the illustrative circuit shown in FIG. 3A is illustrated in FIG. 3B. FIG. 3B is an embodiment of a rolling-shutter pixel that has no storage diode and related elements (e.g., storage gate transistor 304, storage node 306, capacitive element 308 in FIG. 3A). In the embodiment shown in FIG. 3B, node 303 is directly connected to transfer gate 310. In FIG. 3B, the vertical dimension shows the potential of pixel, while the horizontal dimension shows the pixel position along PD 302, node 303, transfer gate 310 and FD 318. The two conditions illustrated include transfer gate 310 in an off state and an on state. Compared to FIG. 2B, there is an extra voltage level $-V_{BB}$ in FIG. 3B that is the applied negative back bias. Compared to $V_{GND}$, this is a negative voltage, hence it is shown as $-V_{BB}$ in FIG. 3B. FIG. 3B also shows two pinning voltages $V_{PIN}$ and $V_{PIN2}<V_{PIN}$ for illustrative purposes. TX 304b gate voltage must be designed to keep the barrier between PD 302b and FD 318b high to prevent leakage, so now it must be near the $-V_{BB}$ voltage level as shown in FIG. 2B. This condition is automatically met by designing and biasing transfer transistor 310 to be normally off. PD charge 302b may be determined by $-V_{BB}$ and $V_{PIN}$, which is greater than the value of PD charge 202b in FIG. 2B. If $V_{PIN2}$ in FIG. 3B has a lower voltage level than $V_{PIN}$ in FIG. 2B, the PD charge 302b can be made greater due to the selection of $V_{BB}$. When the TX 304c gate voltage is set to a high voltage level, the collected charge is emptied into the FD node 318c. This transferred charge 330c is stored in FD node 318c, causing the FD node voltage to move from $V_{PIN2}$ to $V_{AA}$. Thus column readout circuitry coupled to the source follower may read a higher charge without the need to increase voltage level $V_{AA}$. It should be noted that adding storage diode elements shown in FIG. 3A does not change the basic FD node voltage shift when $V_{BB}$ is applied to PD 302. Each pixel 300 may also include multiple signal conversion transistors (not shown) that, when a ground voltage is supplied to the transistor gates, generate a binary signal based on the charge that has accumulated in photodiode 302.

In a first instance, a constant negative back-bias voltage is applied to a pixel to increase the pixel capacity. In a second instance, a variable back-bias voltage that can vary between a negative voltage and ground voltage is applied to a suitably modified pixel to increase the pixel capacity as well as other performance metrics.

Figure 4:
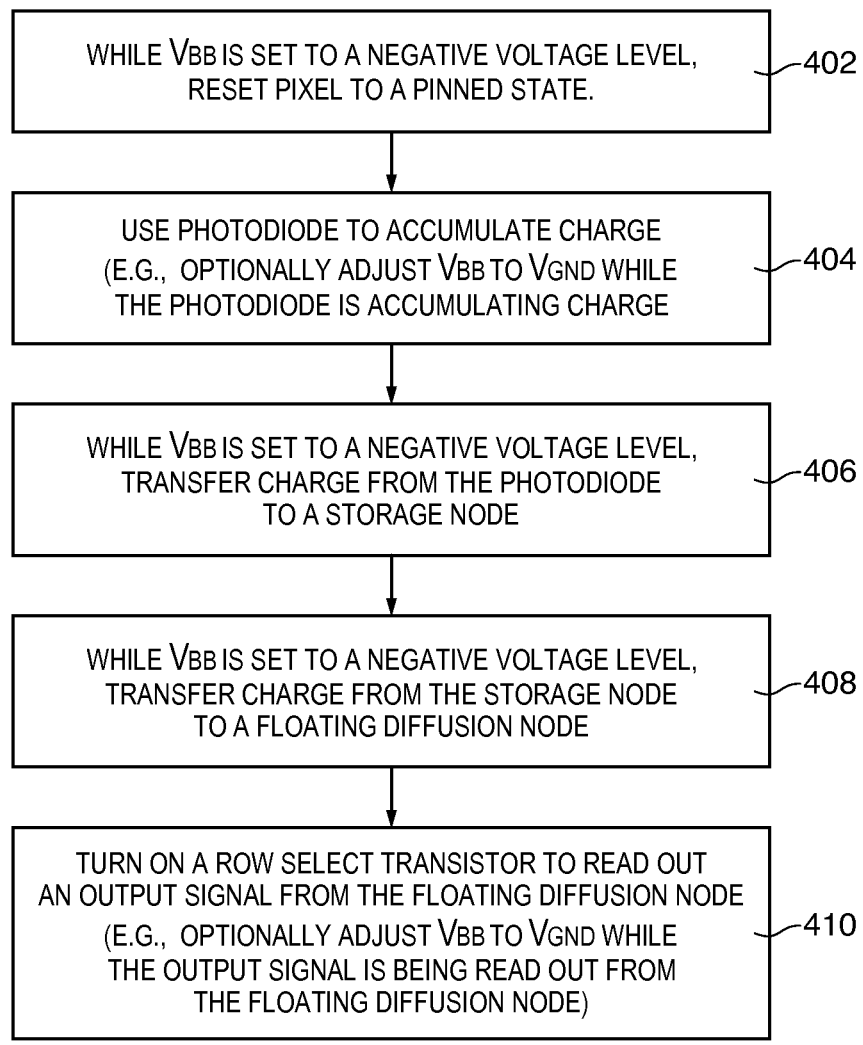
FIG. 4 is a flow chart of the illustrative steps involved in the generation and transmission of an image pixel signal with an image pixel that may employ the embodiment of FIG. 3 in accordance with an embodiment of the present invention.

FIG. 4 is a flow chart of the illustrative steps involved in the generation and transmission of an image pixel signal using an image pixel of the type described in connection with FIG. 3A. At step 402, a reset operation can be performed on a pixel while keeping a bias voltage $V_{BB}$ held at a negative voltage level. For example, during a reset operation, storage node 306, floating diffusion node 318, and photodiode voltage node 303 may be reset by activating reset transistor 314, transfer transistor 310, and storage gate transistor 304. $V_{BB}$ may be held at a negative voltage during this example reset operation. At step 404, charge can be accumulated in a photodiode while $V_{BB}$ is held at ground. For example, during a charge accumulation period, photodiode 302 may accumulate a charge from incident light while $V_{BB}$ is set to ground by backplane bias control circuitry 326. At step 406, charge can be transferred from the photodiode to a storage node while $V_{BB}$ is held at a negative voltage level. For example, storage gate transistor 304 may be activated and a charge from the photodiode 302 is passed through the storage gate transistor 304 to the storage node 306 while $V_{BB}$ is set to a negative voltage level. At step 408, charge can be transferred from the storage node to a floating diffusion node while $V_{BB}$ is held at a negative voltage. For example, after the charge is passed to storage node 306, transfer transistor 310 may be activated and the charge may be passed to floating diffusion node 318 while $V_{BB}$ is set to a negative voltage level. At step 410, charge can be transmitted as an output signal from the floating diffusion node by turning on a row select transistor while $V_{BB}$ is held at ground. For example, the charge may be amplified by source follower transistor 320 and passed to column line 324 through row select transistor 322 while $V_{BB}$ is set to ground.

Alternatively, FIG. 4 is a flow chart of the illustrative steps involved in the generation and transmission of an image pixel signal that uses a constant negative back-bias voltage. $V_{BB}$ may be held at a constant negative voltage during the entire operation of the pixel. At step 402, a reset operation can be performed on a pixel while keeping a bias voltage $V_{BB}$ held at the negative voltage level. For example, during a reset operation, storage node 306, floating diffusion node 318, and photodiode voltage node 303 may be reset by activating reset transistor 314, transfer transistor 310, and storage gate transistor 304. At step 404, charge can be accumulated in a photodiode while $V_{BB}$ is at the negative voltage. For example, during a charge accumulation period, photodiode 302 may accumulate a charge from incident light while $V_{BB}$ is at the constant negative voltage. At step 406, charge can be transferred from the photodiode to a storage node while $V_{BB}$ is held at the negative voltage level. For example, storage gate transistor 304 may be activated and a charge from the photodiode 302 is passed through the storage gate transistor 304 to the storage node 306 while $V_{BB}$ is at the negative voltage level. At step 408, charge can be transferred from the storage node to a floating diffusion node while $V_{BB}$ is held at the negative voltage. For example, after the charge is passed to storage node 306, transfer transistor 310 may be activated and the charge may be passed to floating diffusion node 318 while $V_{BB}$ is at the negative voltage level. At step 410, charge can be transmitted as an output signal from the floating diffusion node by turning on a row select transistor while $V_{BB}$ is held at the negative voltage. For example, the charge may be amplified by source follower transistor 320 and passed to column line 324 through row select transistor 322 while $V_{BB}$ is at the constant negative voltage. All necessary devices are designed to operate at desired levels with the substrate biased to the negative voltage.

In a multi substrate construction, the column readout circuitry coupled to column line 324 of FIG. 3A may reside at a GND voltage at all times. This GND voltage is a chip-level reference voltage. The column readout circuitry is very complex as it includes CDS circuitry, comparators, level-shift circuitry & column memory circuitry to convert a very small SF output analog voltage change to a multi-bit digital voltage. It is known in the art that a 1 volt SF output voltage swing may be converted to a 10-bit or a 12-bit digital output in the column readout circuitry. The column readout circuitry is exercised during every read cycle, and consumes a considerable amount of power due to high pixel operating voltage $V_{AA}$ needed. Thus an increase in PD storage due to $-V_{BB}$ can be exchanged to reduce $V_{AA}$ to lower the power consumption if so desired.

Figure 5:
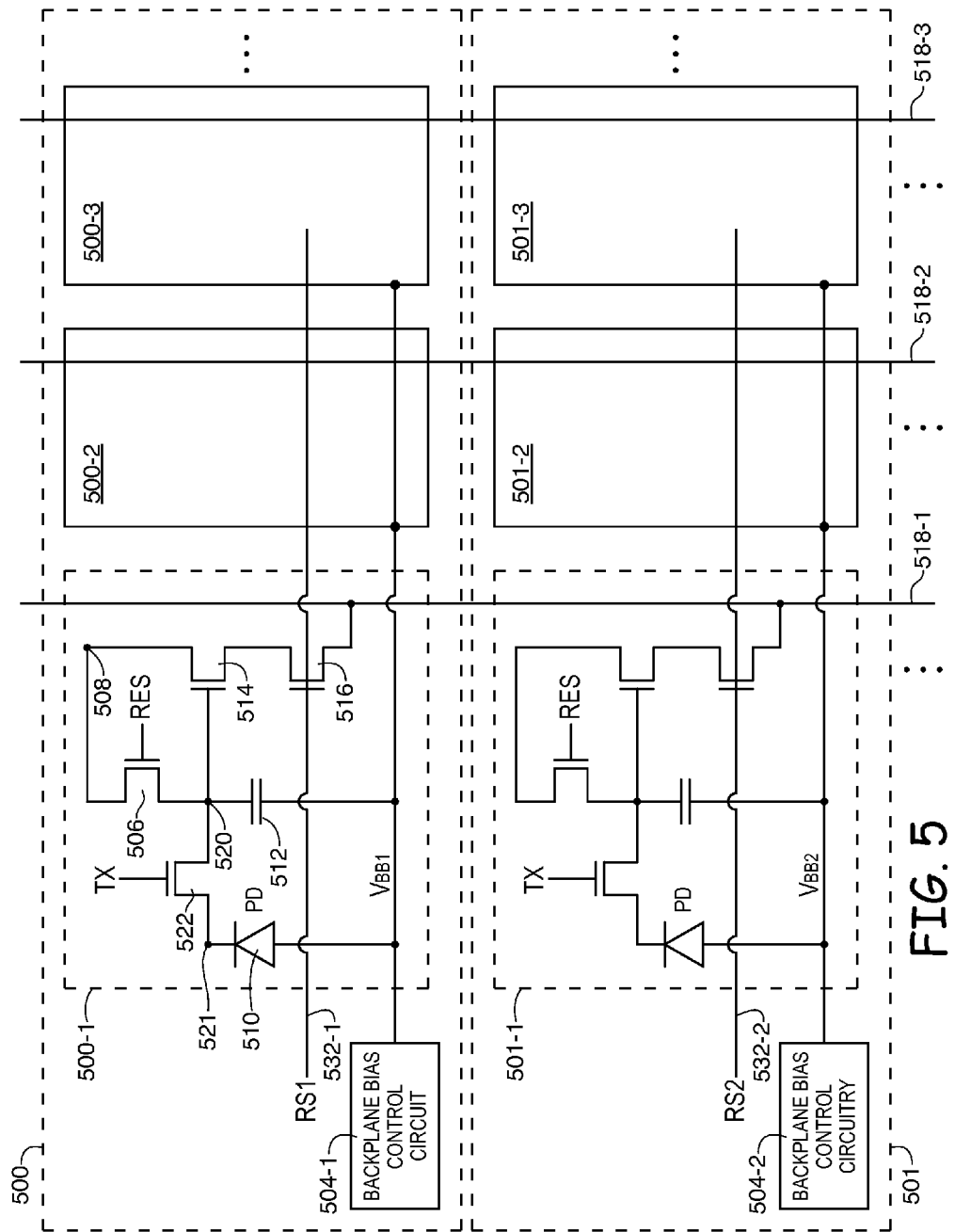
FIG. 5 is a diagram of an array of illustrative image pixels, with each image pixel having a photodiode and a single floating diffusion node and with each row having a backplane bias control circuit connected to the photodiode and a capacitive storage element of the floating diffusion node in each image pixel within the row in accordance with an embodiment.

FIG. 5 is a diagram of an array of illustrative image pixels, with each image pixel having a photodiode and a single floating diffusion node and with each row having a backplane bias control circuit connected to the photodiode and a capacitive storage element of the floating diffusion node in each image pixel within the row in accordance with an embodiment. As shown in FIG. 5, the array may comprise a plurality of rows with each row containing a backplane bias control circuit that may generate an adjustable bias voltage (e.g., adjustable bias voltages $V_{BB1}$ and $V_{BB2}$ may be generated by body biasing control circuits 504-1 and 504-2 that are contained in rows 500 and 501, respectively), a row select line controlled by a row select signal (e.g., row select signals RS1 and RS2 may be asserted to control row select lines 532-1 and 532-2), a plurality of column lines (e.g., column lines 518-1 and 518-2), and a plurality of pixels (e.g., pixels 500-1 and 501-1). The contents of each pixel are shown in detail in pixel 500-1 and may include a photodiode 510, photodiode voltage node 521, transfer transistor 522, reset transistor 506, source follower transistor 514, row select transistor 516, a power supply voltage node 508, a floating diffusion node 520, and a capacitive storage element 512. Each pixel 500-N may also include multiple signal conversion transistors (not shown) that, when a ground voltage is supplied to the transistor gates, generate a binary signal based on the charge that has accumulated in photodiode 510.

Adjusting $V_{BB1}$ to a negative voltage, specifically during charge transfer and reset operations, can help to increase the charge storage capacity of photodiode 510 without increasing power supply voltage at node 508. In a first embodiment, $V_{BB1}$ may be held at a constant negative voltage throughout the pixel operation. In a second embodiment, $V_{BB1}$ may be changed to ground voltage level during charge-accumulation and readout in order to allow a lower voltage drop across oxides and junctions to improve reliability and further reduce reverse-bias junction leakage currents. Pixel 500-1 may transmit an image pixel signal using an ERS process similar to that of pixel 200 of FIG. 2, excepting the coupling of the photodiode 510 and the capacitive storage element 512 to backplane bias control circuit 504-1. In the first embodiment, all backplane bias control circuits in FIG. 5 may be shared by a common circuit for pixel array 500. In the second embodiment, as shown in FIG. 5, each row of the pixel array contains its own backplane bias control circuit 504. Allowing each row to generate a separate adjustable bias voltage $V_{BB}$ in this way ensures the same body bias is applied to each pixel in a given row, which enables the pixel array to be operated in a rolling shutter mode with varying $V_{BB}$ levels for different rows. Charge accumulation and transfer from PD 510 via transfer gate 522 to FD 520 is analogous to the potential-well diagram and description of FIG. 3B.

Figure 6:
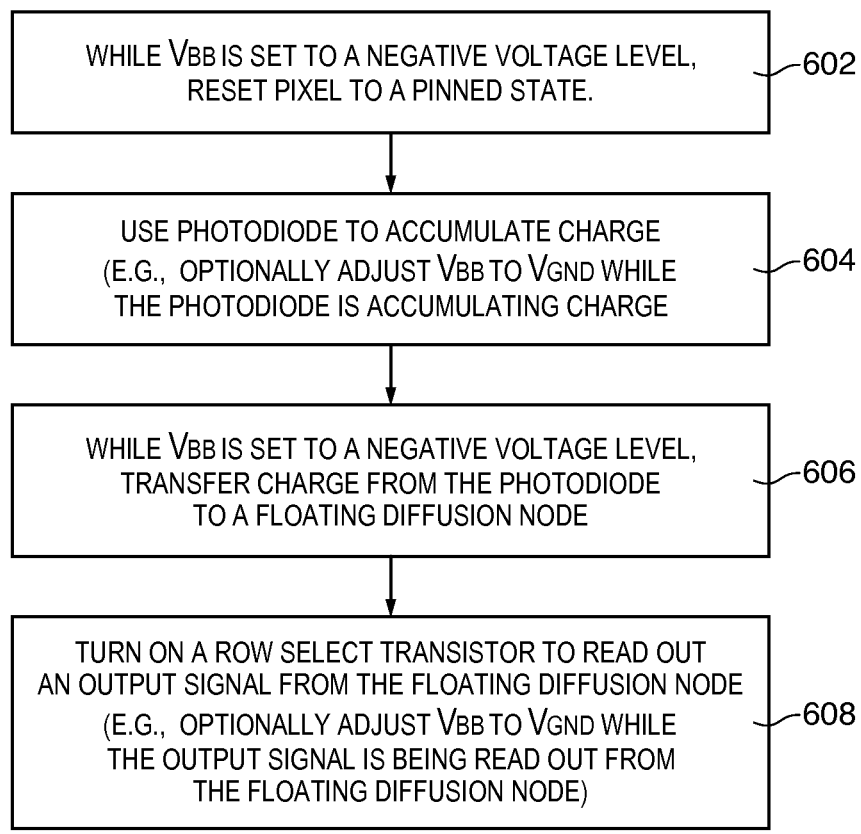
FIG. 6 is a flow chart of the illustrative steps involved in the generation and transmission of an image pixel signal with an image pixel that may employ the embodiment of FIG. 5 in accordance with an embodiment of the present invention.

FIG. 6 is a flow chart of the illustrative steps involved in the generation and transmission of an image pixel signal with an image pixel that may employ an embodiment of FIG. 5 in accordance with the constant backbias voltage embodiment of the present invention. At step 602, a reset operation can be performed on a pixel while keeping a bias voltage $V_{BB1}$ held at a negative voltage level. For example, during a reset operation of pixel 500-1, floating diffusion node 520 and photodiode voltage node 521 may be reset by activating reset transistor 506 and transfer transistor 522. $V_{BB1}$ may be held at a negative voltage during this example reset operation. At step 604, charge can be accumulated in a photodiode while $V_{BB1}$ is held at same negative voltage. For example, during a charge accumulation period, photodiode 510 may accumulate a charge from incident light while $V_{BB1}$ is held at negative $V_{BB1}$ by the backplane bias control circuitry 504-1. At step 606, charge can be transferred from the photodiode to a floating diffusion node while $V_{BB1}$ is held at the negative voltage. For example, after the accumulation period, transfer transistor 522 may be activated and the charge may be passed to floating diffusion node 520 while $V_{BB1}$ is held at the negative voltage level. At step 608, charge can be transmitted as an output signal from the floating diffusion node by turning on a row select transistor while $V_{BB1}$ is continued to be held at negative $V_{BB1}$ voltage. For example, the charge may be amplified by source follower transistor 514 and passed to column line 518-1 through row select transistor 516 while $V_{BB1}$ is at negative voltage. Column circuitry coupled to row-select transistor 516 output 518-1 may include voltage evaluation circuitry. The column circuitry may be constructed in a substrate that is decoupled from the substrate controlled at negative $V_{BB1}$ voltage by backplane bias control circuit 504-1. The column circuitry substrate is held at a constant ground potential $V_{GND}$ during the entire operation of pixel array. Thus the voltage signal on column line 518-1 may be evaluated with circuitry operating at a different substrate potential compared to the pixel array that generated the voltage signal.

The flow chart shown in FIG. 6 may employ the embodiment of FIG. 5 in accordance with the varying backbias voltage embodiment of the present invention. At step 602, a reset operation can be performed on a pixel while keeping a bias voltage $V_{BB1}$ held at a negative voltage level. For example, during a reset operation of pixel 500-1, floating diffusion node 520 and photodiode voltage node 521 may be reset by activating reset transistor 506 and transfer transistor 522. $V_{BB1}$ may be held at a negative voltage during this example reset operation. At step 604, charge can be accumulated in a photodiode while $V_{BB1}$ is held at ground. For example, during a charge accumulation period, photodiode 510 may accumulate a charge from incident light while $V_{BB1}$ is set to ground by backplane bias control circuitry 504-1. At step 606, charge can be transferred from the photodiode to a floating diffusion node while $V_{BB1}$ is held at a negative voltage. For example, after the accumulation period, transfer transistor 522 may be activated and the charge may be passed to floating diffusion node 520 while $V_{BB1}$ is set to a negative voltage level. At step 608, charge can be transmitted as an output signal from the floating diffusion node by turning on a row select transistor while $V_{BB1}$ is held at ground. For example, the charge may be amplified by source follower transistor 514 and passed to column line 518-1 through row select transistor 516 while $V_{BB1}$ is set to ground. Column circuitry coupled to row-select transistor 516 output 518-1 may include voltage evaluation circuitry. The column circuitry may be constructed in a substrate that is decoupled from the substrate controlled at the plurality of negative $V_{BB}$ voltage levels of backplane bias control circuits such as 504-1 and 504-2. The column circuitry substrate may be held at a constant ground potential $V_{GND}$ during the entire operation of pixel array. Thus the voltage signal on column line 518-1 may be evaluated with circuitry operating at a constant ground substrate potential compared to the varying pixel array backplane voltages.

Figure 7:
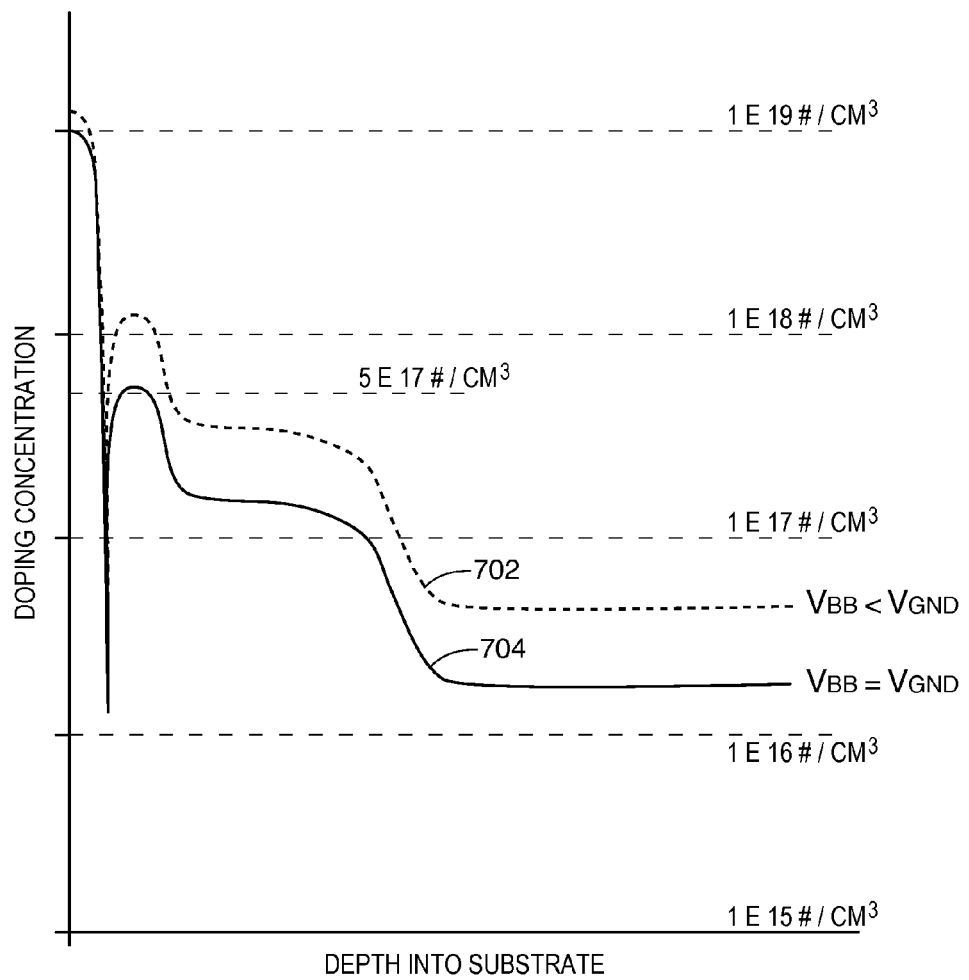
FIG. 7 is a graph plotting dopant concentration versus substrate depth of photodiodes within an image sensor in accordance with an embodiment.

FIG. 7 is a graph plotting dopant concentration versus substrate depth of photodiodes within an image sensor in accordance with an embodiment. The graph illustrates two concentration profiles 702 and 704 applied to two corresponding photodiodes. Profile 702 corresponds to a doping profile of a photodiode that has been configured to operate at a negative bias voltage $V_{BB}$. Profile 704 corresponds to a doping profile of a photodiode that has been configured to operate only at a ground bias voltage $V_{GND}$ which is higher than the negative bias voltage $V_{BB}$ at which the diode corresponding to profile 702 operates. As shown in FIG. 7, the doping concentration of profile 702 is increased compared to the doping concentration of profile 704 across the entire depth of the photodiode. It should be noted that by increasing doping concentration of a photodiode in order to operate at a negative bias voltage, the full well capacity of the photodiode may be increased. In FIG. 7, the implant layer closest to the surface of the substrate is a P+ pinning layer, which is substantially unchanged with either backplane voltage. The implant layers below the surface P+ pinning layer are N-type and their concentrations contribute to the full well capacity. It should be understood that the implant type polarity and bias voltage polarity may be reversed to achieve a back-bias P-type doped photodiode having an N+ pinning layer at the surface.

Figure 8:
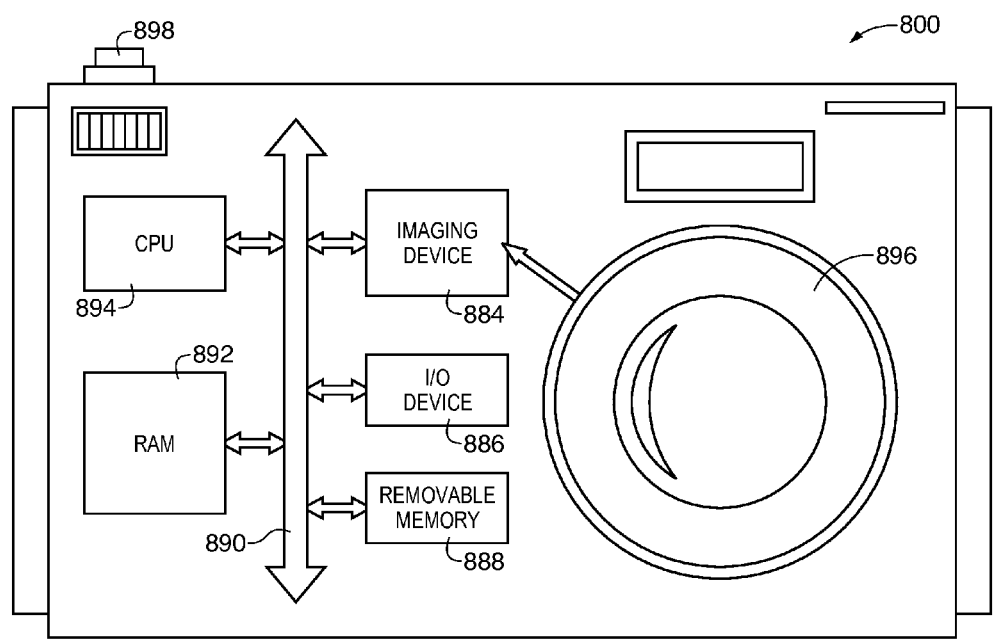
FIG. 8 is a block diagram of a processor system employing the image pixel of FIGS. 3 and 5 in accordance with an embodiment.

FIG. 8 is a block diagram of a processor system employing the image pixel of FIGS. 3A, 3B and 5 in accordance with an embodiment. Device 884 may comprise the elements of device 10 (FIG. 1) or any relevant subset of the elements. Processor system 800 is exemplary of a system having digital circuits that could include imaging device 884. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 800, which may be a digital still or video camera system, may include a lens or multiple lenses indicated by lens 896 for focusing an image onto an image sensor array or multiple image sensor arrays such as image sensor array 16 (FIG. 1) when shutter release button 898 is pressed. Processor system 800 may include a central processing unit such as central processing unit (CPU) 894. CPU 894 may be a microprocessor that controls camera functions and one or more image flow functions and communicates with one or more input/output (I/O) devices 886 over a bus such as bus 890. Imaging device 884 may also communicate with CPU 894 over bus 890. System 800 may include random access memory (RAM) 892 and removable memory 888. Removable memory 888 may include flash memory that communicates with CPU 894 over bus 890. Imaging device 884 may be combined with CPU 894, with or without memory storage, on a single integrated circuit or on a different chip. Although bus 890 is illustrated as a single bus, it may be one or more buses or bridges or other communication paths used to interconnect the system components.

Various embodiments have been described illustrating imaging systems with an image sensor module. The image sensor module may include an array of image sensor pixels and one or more lenses that focus light onto the array of image sensor pixels (e.g., image pixels arranged in rows and columns). The array of image sensor pixels may comprise hardware configured to operate in global shutter or rolling shutter modes. Each pixel may be coupled to backplane bias control circuitry that provides an adjustable bias voltage to a photodiode and to capacitive storage elements.

An image sensor pixel may include a floating diffusion region, a photodiode having a first terminal and a second terminal, a charge transfer transistor that is coupled between the first terminal of the photodiode and the floating diffusion region, and body bias control circuitry that may provide a control voltage to the second terminal of the photodiode that is different than the ground power supply voltage. The floating diffusion region of the image sensor pixel may be capacitively coupled to the body bias control circuitry.

In an embodiment, the image sensor pixel may include a storage region that is different than the floating diffusion region and that is capacitively coupled to the body bias circuitry. The charge transfer transistor may be coupled between the floating diffusion region and the storage region. In this embodiment, the image sensor pixel may include an additional charge transfer transistor that is coupled between the storage region and the first terminal of the photodiode.

In one embodiment, the body bias control circuitry may be configured to adjust the control voltage to a negative voltage level to be less than the ground power supply voltage. In another embodiment, the body bias control circuitry may be configured to bias the control voltage to only a negative voltage level that is less than the ground power supply voltage. In yet another embodiment, the body bias control circuitry may be configured to bias the control voltage to be different than the ground power supply voltage during a first pixel operation and to bias the control voltage to be equal to the ground power supply voltage during a second pixel operation.

In another embodiment, an image pixel may have a floating diffusion region and a photodiode that is coupled to the floating diffusion region via a charge transfer transistor. The image pixel may operate by accumulating charge with the photodiode, supplying a ground voltage to a gate of the charge transfer transistor while the photodiode is accumulating charge, and providing a control voltage that is different from the ground voltage to the photodiode with body bias control circuitry. While the charge is being accumulated in the photodiode, the body bias control circuitry may be used to adjust the control voltage to be equal to the ground voltage. The photodiode may have a first terminal that is coupled to the charge transfer gate and a second terminal that is coupled to the body bias control circuitry.

The body bias control circuitry may be used to adjust the control voltage to be less than the ground voltage or may be used to adjust the control voltage to be equal to the ground voltage. The body bias control circuitry may be used to adjust the control voltage to be less than the ground voltage during a reset phase.

A positive voltage may be supplied to the gate of the charge transfer transistor to turn on the charge transfer transistor. While the charge transfer transistor is turned on, the accumulated charge from the photodiode may be transferred from the photodiode to the floating diffusion region. While the accumulated charge from the photodiode is being transferred to the floating diffusion region, the body bias control circuitry may be used to adjust the control voltage to be less than the ground voltage. In another embodiment, the image pixel may include a storage region that is different from the floating diffusion region and an additional charge transfer transistor. Charge from the photodiode may be transferred to the storage region via the additional charge transfer transistor. Charge from the storage region may be transferred to the floating diffusion region via the charge transfer transistor. The body bias control circuitry may be used to adjust the control voltage to be less than the ground voltage while transferring charge from the photodiode to the storage region via the additional charge transfer transistor.

A system may include a central processing unit, memory, a lens, input-output circuitry, and an imaging device. The imaging device may comprise an array of pixels arranged in rows and columns, a first backplane bias control circuit that provides a first body bias control signal to a first row of pixels in the array, and a second backplane bias control circuit that provides a second body bias control signal to a second row of pixels in the array. Each pixel in the first row may include a p-type terminal that receives the first body bias control signal from the first backplane bias control circuit.

Each pixel in the second row may include a p-type terminal that receives the second body bias control signal from the second backplane bias control circuit. The first body bias control signal may be different than the second body bias control signal. The first backplane bias control circuit may be operable to adjust the first body bias control signal to a ground signal level while the second backplane bias control circuit adjusts the second body bias control signal to a negative signal level that is less than the ground signal level. Each pixel in the array may include a charge transfer transistor. The first backplane bias control circuit may adjust the first body bias control signal to a negative signal level when the at least one charge transfer transistor in the first row is turned on. The second backplane bias control circuit may adjust the second body bias control signal to a ground signal level when the at least one charge transfer transistor in the second row is turned off.

In an embodiment, an image sensor may include a pixel and multiple signal conversion transistors. The pixel may operate by accumulating charge with the photodiode, supplying a ground voltage to a gate of the charge transfer transistor while the photodiode is accumulating charge, and providing a control voltage that is different from the ground voltage to the photodiode with body bias control circuitry. In another embodiment, the control voltage may be less than the ground voltage. When a ground voltage is applied to the gates of the signal conversion transistors, the signal conversion transistors may generate a binary signal based on charge that has accumulated in the photodiode. The photodiode may have a first terminal that is coupled to the charge transfer gate and a second terminal that is coupled to the body bias control circuitry.

A positive voltage may be supplied to the gate of the charge transfer transistor to turn on the charge transfer transistor. While the charge transfer transistor is turned on, the accumulated charge from the photodiode may be transferred from the photodiode to a floating diffusion region. In another embodiment, the pixel may include a storage region that is different from the floating diffusion region and an additional charge transfer transistor. Charge from the photodiode may be transferred to the storage region via the additional charge transfer transistor. Charge from the storage region may be transferred to the floating diffusion region via the charge transfer transistor.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor pixel, comprising:
   a photodiode having a first terminal and a second terminal;
   a source follower transistor having a terminal that is operable to couple to the first terminal of the photodiode, a first terminal coupled to a power supply, and a second terminal;
   a plurality of transistors coupled to the second terminal of the source follower transistor, wherein at least one of the plurality of transistors has a terminal that is operable to receive a ground power supply voltage; and
   body bias control circuitry that provides a control voltage to the second terminal of the photodiode that is different than the ground power supply voltage, wherein the body bias control circuitry is configured to bias the control voltage to be different than the ground power supply voltage during a first pixel operation and to bias the control voltage to be equal to the ground power supply voltage during a second pixel operation.

2. The image sensor pixel defined in claim 1, wherein the body bias control circuitry is configured to adjust the control voltage to a negative voltage level to be less than the ground power supply voltage.

3. The image sensor pixel defined in claim 1, wherein the body bias control circuitry is configured to bias the control voltage to only a negative voltage level that is less than the ground power supply voltage.

4. The image sensor pixel defined in claim 1, further comprising:
   a floating diffusion region coupled to the gate of the source follower transistor; and
   a charge transfer transistor that is coupled between the first terminal of the photodiode and the floating diffusion region, wherein the charge transfer transistor has a gate that is operable to couple or decouple the photodiode and the floating diffusion.

5. The image sensor pixel defined in claim 1, further comprising:
   a storage region that is different than the floating diffusion region and that is capacitively coupled to the body bias control circuitry.

6. The image sensor pixel defined in claim 5, wherein the charge transfer transistor is coupled between the floating diffusion region and the storage region, further comprising:
   an additional charge transfer transistor that is coupled between the storage region and the first terminal of the photodiode.

7. A method of operating an image pixel having a floating diffusion region and a photodiode that is coupled to the floating diffusion region via a charge transfer transistor and a plurality of signal evaluation transistors coupled to the floating diffusion region via a source follower transistor, the method comprising:
   accumulating charge with the photodiode;
   while the photodiode is accumulating charge, supplying an off state voltage to a gate of the charge transfer transistor and a ground voltage to one or more terminals of the plurality of signal evaluation transistors; and
   providing a control voltage to the photodiode with body bias control circuitry, wherein the control voltage is different than the ground voltage.

8. The method defined in claim 7, wherein the photodiode has a first terminal that is coupled to the charge transfer gate and a second terminal that is coupled to the body bias control circuitry.

9. The method defined in claim 7, further comprising:
   using the body bias control circuitry to adjust the control voltage to be less than the ground voltage.

10. The method defined in claim 7, further comprising:
    using the body bias control circuitry to adjust the control voltage to be equal to the ground voltage.

11. The method defined in claim 7, further comprising:
    during a reset phase, using the body bias control circuitry to adjust the control voltage to be less than the ground voltage.

12. The method defined in claim 7, further comprising:
supplying a positive voltage to the gate of the charge transfer transistor to turn on the charge transfer transistor;
while the charge transfer transistor is turned on, transferring the accumulated charge from the photodiode to the floating diffusion region; and
while the charge transfer transistor is transferring the accumulated charge from the photodiode to the floating diffusion region, using the body bias control circuitry to adjust the control voltage to be less than the ground voltage.

13. The method defined in claim 12, further comprising:
while the charge is being accumulated in the photodiode, using the body bias control circuitry to adjust the control voltage to be equal to the ground voltage.

14. The method defined in claim 7, wherein the image pixel further includes a storage region that is different than the floating diffusion region and an additional charge transfer transistor, the method further comprising:
transferring charge from the photodiode to the storage region via the additional charge transfer transistor;
transferring charge from the storage region to the floating diffusion region via the charge transfer transistor; and
while transferring charge from the photodiode to the storage region via the additional charge transfer transistor, using the body bias control circuitry to adjust the control voltage to be less than the ground voltage.

15. A system, comprising:
a central processing unit;
memory;
a lens;
input-output circuitry; and
an imaging device, wherein the imaging device comprises:
an array of pixels arranged in rows and columns;
a first backplane bias control circuit that provides a first body bias control signal to a first row of pixels in the array; and
a second backplane bias control circuit that provides a second body bias control signal to a second row of pixels in the array, wherein the first backplane bias control circuit is operable to adjust the first body bias control signal to a ground signal level while the second backplane bias control circuit adjusts the second body bias control signal to a negative signal level that is less than the ground signal level.

16. The system defined in claim 15, wherein each pixel in the first row includes a p-type terminal that receives the first body bias control signal from the first backplane bias control circuit, and wherein each pixel in the second row includes a p-type terminal that receives the second body bias control signal from the second backplane bias control circuit.

17. The system defined in claim 15, wherein the first body bias control signal is different than the second body bias control signal.

18. The system defined in claim 15, wherein each pixel in the array further includes a charge transfer transistor, wherein the first backplane bias control circuit adjusts the first body bias control signal to a negative signal level when at least one charge transfer transistor in the first row is turned on, and wherein the second backplane bias control circuit adjusts the second body bias control signal to the ground signal level when the at least one charge transfer transistor in the second row is turned off.

19. A method of operating an image sensor having a pixel and a plurality of signal conversion transistors, the method comprising:
accumulating charge with a photodiode in the pixel;
generating a binary signal from the photodiode accumulated charge with the plurality of signal conversion transistors, wherein a ground voltage is supplied to one or more terminals of the plurality of signal conversion transistors to generate the binary signal; and
providing a control voltage to the photodiode with body bias control circuitry, wherein the control voltage is different than the ground voltage.

20. The method defined in claim 19, wherein the photodiode has a first terminal that is coupled to a charge transfer gate and a second terminal that is coupled to the body bias control circuitry.

21. The method defined in claim 19, wherein the control voltage is less than the ground voltage.

22. The method defined in claim 19, wherein the photodiode further includes a floating diffusion region, a storage region that is different than the floating diffusion region, and an additional charge transfer transistor, the method further comprising:
transferring charge from the photodiode to the storage region via the additional charge transfer transistor; and
transferring charge from the storage region to the floating diffusion region via the charge transfer transistor.

* * * * *